(12) United States Patent
Chinthagunti

(10) Patent No.: US 10,324,923 B1
(45) Date of Patent: Jun. 18, 2019

(54) DETECTING VARIATIONS IN DATA CHARACTERISTICS

(71) Applicant: AMAZON TECHNOLOGIES, INC., Seattle, WA (US)

(72) Inventor: Paparao Chinthagunti, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 547 days.

(21) Appl. No.: 14/536,944

(22) Filed: Nov. 10, 2014

(51) Int. Cl.
*G06F 16/23* (2019.01)

(52) U.S. Cl.
CPC .................. *G06F 16/2365* (2019.01)

(58) Field of Classification Search
CPC ............ G06F 17/30371; G06F 16/2365
See application file for complete search history.

(56) References Cited

U.S. PATENT DOCUMENTS

| | | | |
|---|---|---|---|
| 8,019,737 B2 | 9/2011 | Kocsis et al. | |
| 8,613,048 B2 | 12/2013 | Braddy et al. | |
| 9,575,979 B1* | 2/2017 | McClintock | G06F 21/6218 |
| 2008/0313498 A1* | 12/2008 | Jennings | G06F 11/0727 |
| | | | 714/25 |
| 2009/0210368 A1* | 8/2009 | Deo | G06K 9/6267 |
| | | | 706/20 |
| 2010/0205159 A1 | 8/2010 | Li et al. | |
| 2013/0138808 A1 | 5/2013 | Biller | |
| 2013/0144844 A1* | 6/2013 | Ito | G06F 17/30144 |
| | | | 707/688 |
| 2013/0185309 A1 | 7/2013 | Bhide et al. | |
| 2013/0226879 A1 | 8/2013 | Talukder et al. | |
| 2013/0232123 A1* | 9/2013 | Ahmed | G06F 17/30289 |
| | | | 707/690 |
| 2014/0081931 A1 | 3/2014 | Kung et al. | |
| 2014/0143891 A1 | 5/2014 | Adams et al. | |
| 2014/0229479 A1* | 8/2014 | Sharafi | G06F 17/30884 |
| | | | 707/736 |
| 2014/0250092 A1 | 9/2014 | Nakayama | |

OTHER PUBLICATIONS

International Publication No. WO 2009/148691 A1—Inventors/Applicants (for US only): Johnson, William, D. Stokes, Darel, R. .WO 2009/148691. Title: Using Metadata Analysis for Monitoring, Alerting, and Remediation. International Filing Date: Mar. 31, 2009 (Mar. 31, 2009).*

(Continued)

*Primary Examiner* — Mark D Featherstone
*Assistant Examiner* — Faezeh Forouharnejad
(74) *Attorney, Agent, or Firm* — Lindauer Law, PLLC

(57) ABSTRACT

Techniques are described for identifying changes in the structure or behavior of a data feed generated by a source process. The changes may be identified based on metadata that describes the structure or behavior of the data in the data feed. A baseline set of metadata may be determined and stored for the data feed, the baseline metadata describing the data feed during a first time period. A current set of metadata may then be determined for the data feed, the current metadata describing the data feed during a second time period subsequent to the first time period. Variations in the current metadata relative to the baseline metadata may be described in results information sent in a notification.

20 Claims, 9 Drawing Sheets

(56) References Cited

OTHER PUBLICATIONS

Abraham, Ahmed M., "Non-final Office Action dated Feb. 12, 2015", U.S. Appl. No. 13/796,361, The United States Patent and Trademark Office, filed Feb. 12, 2015.

Abraham, Ahmed M., "Notice of Allowance dated Jun. 17, 2015", U.S. Appl. No. 13/796,361, The United States Patent and Trademark Office, filed Jun. 17, 2015.

* cited by examiner

US 10,324,923 B1

DETECTING VARIATIONS IN DATA CHARACTERISTICS

BACKGROUND

Commercial enterprises and other organizations often store a large amount of data related to their operations. For example, an online business may maintain data describing products, sale transactions, customers, vendors, online activities of customers, and so forth. In some cases, the data produced by one group, process, or individual in an organization may be consumed by various other groups, processes, or individuals in the organization. Accordingly, if the data produced in one part of the organization is corrupt, incomplete, or altered, other operations within the organization may be negatively impacted.

Figure 1:
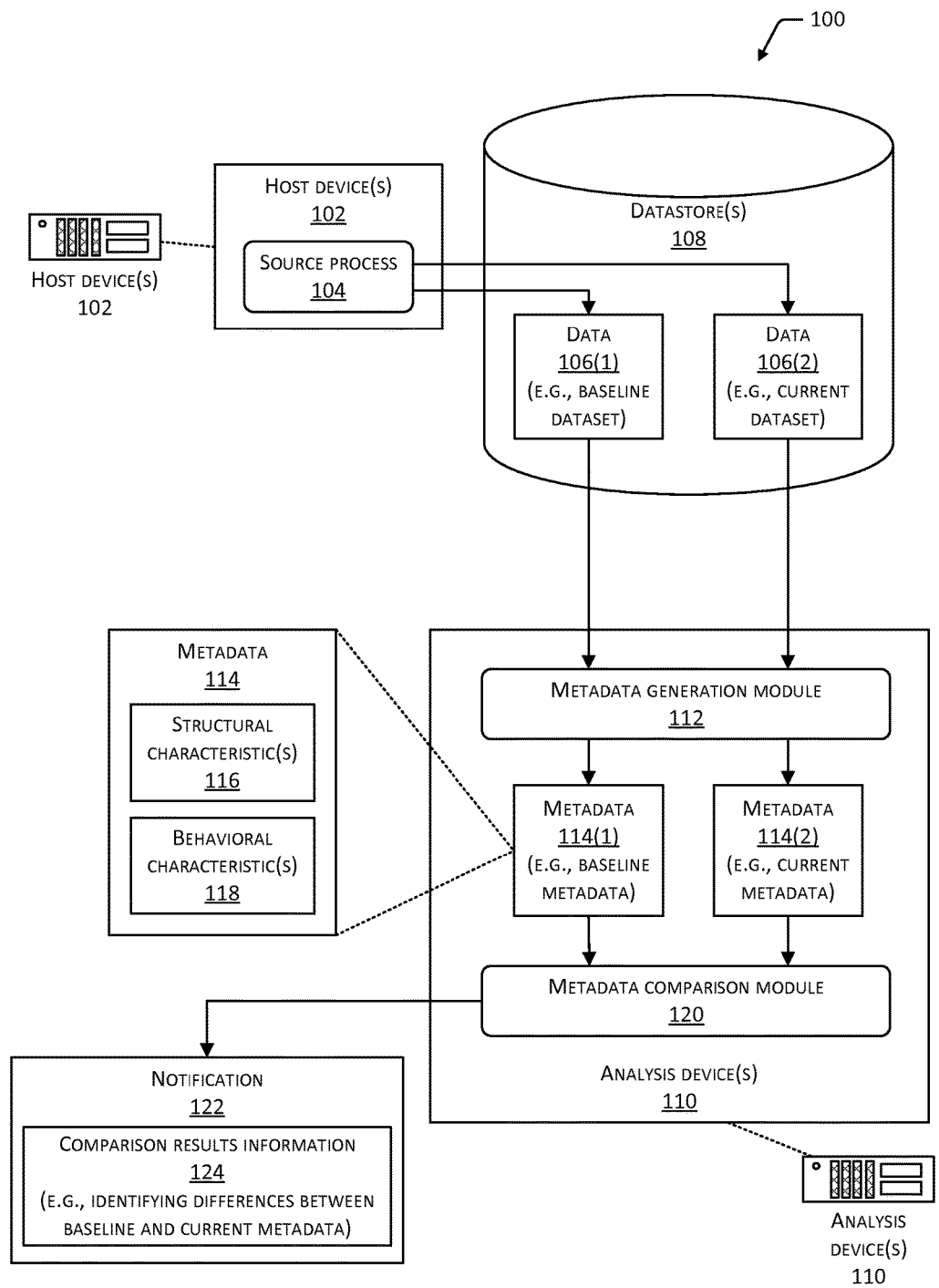
FIG. 1 depicts an environment for detecting changes in data using metadata that describes structural and behavioral characteristics of the data, the metadata determined on analysis device(s).

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes implementations of systems, devices, methods, and computer-readable media for employing metadata to detect a change in structural or behavioral characteristics of a data feed. In an environment such as a data warehouse environment where a large quantity of data is generated, stored, and retrieved for various operations, a variety of source processes may generate any number of data feeds. Each data feed may include data to be stored on one or more datastores, and the stored data may be read by processes and individuals. In some cases, changes in a source process may lead to changes in a data feed. For example, a data feed may be structurally altered to write to a different database table, to write to a different column in a table, or to write a larger amount of data than the previous size of a column. As another example, a data feed may be behaviorally altered such that the data includes a different number of distinct values for a column, a different range of values, or a different number of null values. When there is a change in a data feed written to datastore(s), individuals or processes that use the data for downstream processing, business operations, analysis, or other uses may not detect the change. Accordingly, changes in a data feed may negatively impact processes that were developed based on the prior structure or behavior of the data feed.

Implementations automatically detect structural or behavioral changes in a data feed by identifying variations in metadata that describe structural and behavioral characteristics of the data feed. In some implementations, a data feed generated by a source process during a first time period may be analyzed to determine first metadata describing the structural and behavioral characteristics of the data. The first metadata may be stored and subsequently employed as baseline metadata. The data feed generated by the source process during a second (e.g., later) time period may then be analyzed to determine second (e.g., current) metadata. The second metadata may be compared to the first metadata, and any differences between the two sets of metadata may be identified. A notification describing the differences, if any, may be communicated to individuals associated with the source process such as developers, managers, testers, product managers, and so forth. The notification may also be sent to individuals associated with data consuming processes that use the stored data, to enable such processes to be modified according to the changed structure or behavior. By automatically detecting structural or behavioral changes in a data feed, implementations may mitigate the possible negative impact of such changes on downstream processes or on individuals who consume the data.

FIG. 1 depicts an environment 100 in which implementations may operate. As shown in FIG. 1, the environment 100 may include one or more host devices 102. The host device(s) 102 may comprise any type of computing device, including but not limited to a network computer, a server computer, a mainframe computer, a distributed computing device (e.g., a cloud server), a personal computer, a smartphone, a tablet computer, a wearable computer, an implanted computer, a mobile gaming device, an e-book reader, an automotive computer, a desktop computer, a laptop computer, a game console, a home entertainment device, and so forth. Although examples herein may describe the host device(s) 102 as physical device(s), implementations are not so limited. In some cases, the host device(s) 102 may include one or more of a virtual computing environment, a hypervisor, a device emulation, or a virtual machine executing on one or more physical computing devices. In some cases, two or more of the host devices 102 may comprise a cluster, cloud, farm, or other grouping of multiple devices that coordinate operations to provide load balancing, failover support, parallel processing capabilities, shared storage resources, or other aspects. The host device(s) 102 are described further with reference to FIG. 4.

The host device(s) 102 may execute any number of source processes 104 and each source process 104 may generate a data feed comprising data 106. Implementations support any type of source process 104 generating any type of data 106 in any amount or format. In some cases where the environment 100 supports a business such as an e-commerce organization, the source process 104 may perform operations associated with the business. For example, the source process 104 may process customer information, payments, purchase requests, shipping records, and so forth. The source process 104 may also perform operations to provide a web site or other application(s) for interacting with customers, process data that is received from or presented to customers, and so forth.

The source process 104 may store data 106 in one or more datastores 108. A datastore 108 may be a data storage system configured to store any type of data in any type of storage format, using any type of data storage technology. In some cases, the datastore(s) 108 may include relational datastore(s) 108, such as databases that employ a relational database management system (RDBMS). A relational datastore 108 may employ a relational storage format including one or more formally described tables, each table including one or more columns that are each associated with a data attribute. The relational datastore(s) 108 may include, but are not limited to, database(s) managed through one or more of the following: Oracle and MySQL, from Oracle Corporation of Redwood City, Calif., United States; DB2, from International Business Machines (IBM) Corporation of Armonk, N.Y., United States; Linter, from RELEX Group of Voronezh, Russia; Microsoft Access and Microsoft SQL Server, from Microsoft Corporation of Redmond, Wash., United States; PostgreSQL, from the PostgreSQL Global Development Group; or SQLite, from D. Richard Hipp.

The datastore(s) 108 may also include any number of non-relational datastores 108 that employ a non-relational storage format, such as a "not only SQL" (NoSQL) datastore 108. In some cases, a non-relational datastore 108 may employ a hierarchical database model, a network database model, or any other non-relational data storage model. Non-relational datastore(s) 108 may include any number of key-value datastores, hash tables, flat files, associative arrays, other types of data structures. Non-relational datastore(s) 108 may also store data that is at least partly unstructured. Non-relational datastore(s) 108 may include, but are not limited to, datastore(s) 108 managed through one or more of the following: FoxPro database management system, from Microsoft Corporation of Redmond, Wash., United States; ParAccel Analytic Database, from ParAccel, Incorporated of San Diego, Calif., United States; or Hadoop from the Apache Software Foundation.

The environment 100 may include one or more analysis device(s) 110. The analysis device(s) 110 may comprise any type of computing device(s), including but not limited to those types of devices described with reference to the host device(s) 102. Although examples herein may describe the analysis device(s) 110 as physical device(s), implementations are not so limited. In some cases, the analysis device(s) 110 may include one or more of a virtual computing environment, a hypervisor, a device emulation, or a virtual machine executing on one or more physical computing devices. In some cases, two or more of the analysis devices 110 may comprise a cluster, cloud, farm, or other grouping of multiple devices that coordinate operations to provide load balancing, failover support, parallel processing capabilities, shared storage resources, or other aspects. The analysis device(s) 110 are described further with reference to FIG. 5.

The analysis device(s) 110 may execute a metadata generation module 112. The metadata generation module 112 may be configured to access a dataset of the data 106 stored in the datastore(s) 108, analyze the data 106, and generate metadata 114 that describes the data 106. The metadata 114 may include one or more structural characteristics 116 that describe the structure of the data 106, such as the table the data 106 is written to, the column(s) the data 106 is written to, the size or data type of the column(s), and so forth. The metadata 114 may include one or more behavioral characteristics 118 that describe the behavior of the data 106, such as the range of values in column(s), the number of distinct values in column(s), the number of null values in column(s), and so forth. In some cases, the metadata 114 may include both structural characteristic(s) 116 and behavioral characteristic(s) 118. Because the behavioral characteristic(s) 118 may tend to change more frequently than the structural characteristic(s) 116, the behavioral characteristic(s) 118 may be described as transient or dynamic characteristic(s) relative to the structural characteristic(s) 116. The metadata 114 is described further with reference to FIG. 3.

In some implementations, the metadata generation module 112 may access a first set of data 106(1) that is generated and stored by the source process 104 during a first time period. The metadata generation module 112 may analyze the data 106(1) to determine metadata 114(1), which may then be stored on the analysis device(s) 110 or elsewhere. The metadata 114(1) may subsequently be employed as baseline metadata 114 to detect subsequent changes in the metadata 114. In some cases, the metadata 114(1) may be based on the data 106(1) that is generated by the source process 104 during a time period following the initial deployment and execution of the source process 104. The determination of the metadata 114(1) is described further with reference to FIGS. 6 and 9.

The metadata generation module 112 may access a second set of data 106(2) that is generated and stored by the source process 104 during a second time period. In some cases, the second time period may be non-contemporaneous, or at least partly non-overlapping, with the first time period. Accordingly, the data 106(2) may be generated based on operations of the source process 104 during a different time period than the first time period. In some cases, the second time period may begin after the start of the first time period or after the end of the first time period. The metadata generation module 112 may analyze the data 106(2) to determine metadata 114(2). In some cases, the metadata 114(2) may be current metadata 114(2) that describes the data feed of the source process 104 during a time period immediately preceding the analysis that generates the metadata 114(2). The metadata 114(2) may be generated periodically, such as daily, weekly, monthly, and so forth. In some cases, the metadata 114(2) may be generated in response to updates to the data 106(2). For example, generation of data 106(2) by the source process 104 may prompt the determination of the metadata 114(2) that describes the data 106(2). The frequency of the determination of the metadata 114(2) may be based on the frequency of updates to the data 106(2). Accordingly, the metadata 114(2) may be at least partly transient or dynamic in that it may change based on changes in the data 106(2). The determination of the metadata 114(2) may be scheduled based on updates to the data 106(2) or based on other factors.

The analysis device(s) 110 may execute a metadata comparison module 120 that compares the metadata 114(1) to the metadata 114(2) to identify any differences between the metadata 114(1) and the metadata 114(2). If any differences are identified, a notification 122 may be generated to include comparison results information 124 describing the difference(s). The determination of the metadata 114(2) and the comparison of the metadata 114(2) to the metadata 114(1) are described further with reference to FIGS. 7 and 8.

The notification 122 may be provided to one or more individuals associated with the operations of the source process 104 on the host device(s) 102, such as developers, testers, managers, program managers, or others. In some cases, the notification 122 and the comparison results information 124 included therein may enable such individuals to perform actions based on the detected changes in the data feed. For example, based on the notification 122 the individual(s) may examine the source process 104 to determine whether the change(s) are appropriate, or may modify the source process 104 to restore the data feed to its baseline characteristic(s).

In some cases, the notification 122 may enable the individual(s) associated with the source process 104 to inform other individual(s) who consume the data 106 or who are associated with data consuming process(es) that access the data 106. Alternatively, the notification 122 may be sent to the other individual(s) who consume the data 106 or who are associated with data consuming process(es) that access the data 106. The notification 122 may be communicated or otherwise provided using any method, including but not limited to e-mail or other types of messaging, reports presented through a web page or other user interface, report(s) written to a shared folder or storage, push notification(s) to computing device(s), printed hard copies of the notification 122, and so forth.

In some cases, the generation of either or both of the metadata 114(1) or the metadata 114(2) may be performed dynamically or in real time with respect to the generation and storage of the corresponding data 106(1) or data 106(2). Dynamic operations may be launched within a same execution path, or synchronously with, another process. For example, in some implementations the operations performed by the source process 104 to generate the data 106(1) or the data 106(2) may trigger or spawn the operations to generate the metadata 114(1) or the metadata 114(2). Accordingly, the generation of the metadata 114(1) or the metadata 114(2) may be performed synchronously with, or within a same execution path as, the generation of the data 106(1) or the data 106(2). Moreover, in some cases the generation of the metadata 114(1) or the metadata 114(2) may be in real time with respect to the generation and storage of the data 106(1) or the data 106(2). For example, the generation of the metadata 114(1) or the metadata 114(2) may be performed within a predetermined (e.g., brief) time period relative to the generation or storage of the data 106(1) or the data 106(2).

The dynamic or real time generation of the metadata 114(1) or the metadata 114(2) may contrast with asynchronous, offline, or static operations to generate the metadata 114(1) or the metadata 114(2) at a time subsequent to the generation and storage of the data 106(1) or the data 106(2). In some implementations, the generation of the metadata 114(2) may be performed by an offline process that executes periodically (e.g., every three days) to analyze the data 106(2) that has been stored since the last time the metadata 114(2) was generated. Such offline processing to generate the metadata 114(2) may enable the source process 104 to generate and store the data 106(2) without the processing cost, latency, or other effects that may be introduced via dynamic or real time generation of the metadata 114(2).

Figure 2:
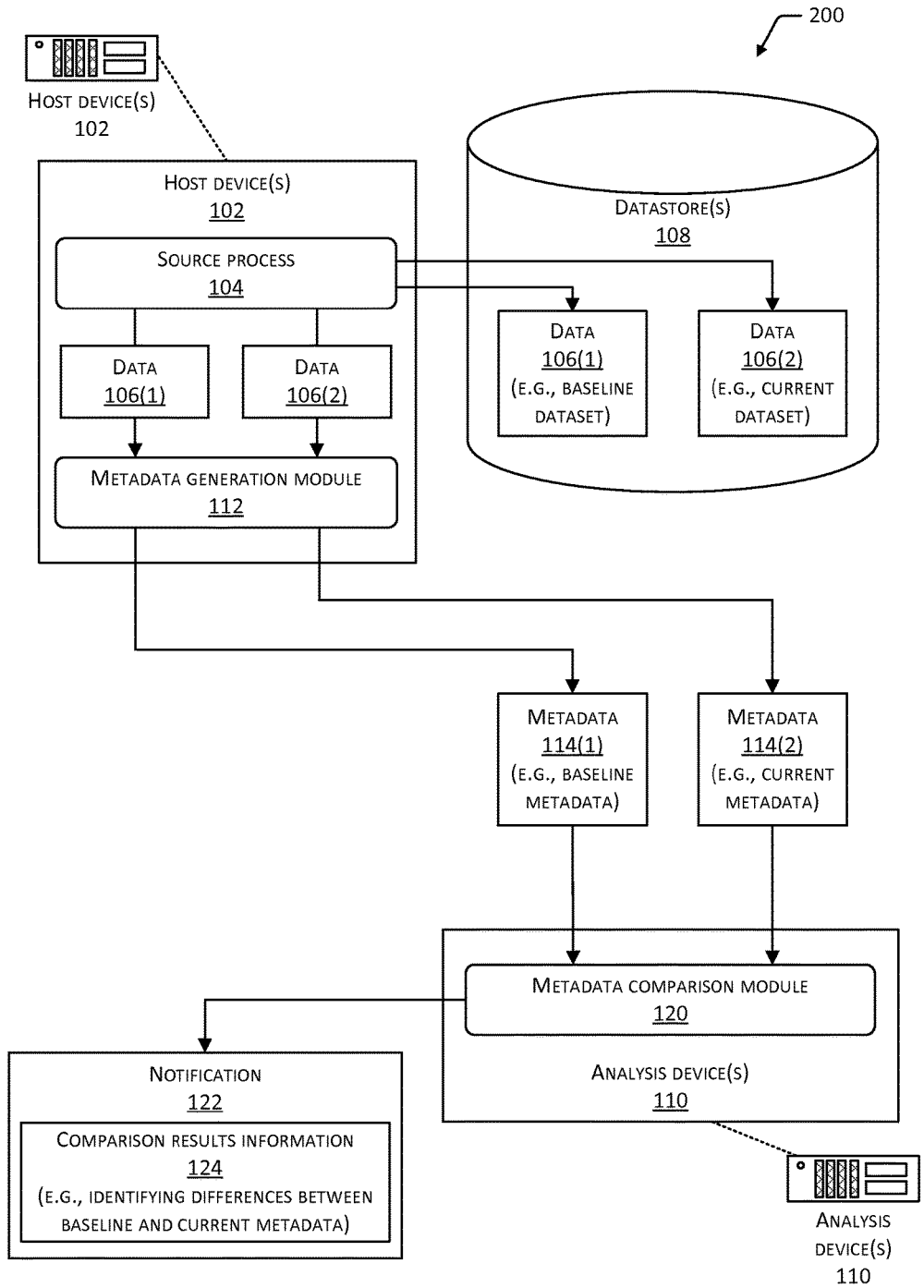
FIG. 2 depicts an environment for detecting changes in data using metadata that describes structural and behavioral characteristics of the data, the metadata determined on host device(s).

FIG. 1 depicts the environment 100 in which the metadata 114(1) and the metadata 114(2) may be determined through operations of the metadata generation module 112 on the analysis device(s) 110. FIG. 2 depicts an environment 200 in which the metadata generation module 112 may execute on the host device(s) 102 to determine one or both of the metadata 114(1) and the metadata 114(2). The elements depicted in FIG. 2 may be configured similarly, and may perform similar operations, to like-numbered elements depicted in FIG. 1.

As shown in the example of FIG. 2, the metadata generation module 112 may access and analyze the data 106(1) and the data 106(2) on the host device(s) 102 to determine, respectively, the metadata 114(1) and the metadata 114(2). In some implementations, the metadata generation module 112 may be incorporated into the source process 104, such that a component of the source process 104 analyzes the data 106(1) and the data 106(2) to determine, respectively, the metadata 114(1) and the metadata 114(2). For example, the source process 104 may be instrumented to generate the metadata 114(1) and the metadata 114(2) based on the data 106(1) and the data 106(2). The metadata 114(1) and the metadata 114(2) may be communicated to the analysis device(s) 110, and compared via operations of the metadata comparison module 120. In some implementations illustrated by FIG. 2, one or both of the metadata 114(1) and the metadata 114(2) may be determined dynamically or in real time with respect to the generation of the data 106(1) and the data 106(2) respectively.

The various devices of the environments 100 and 200 may communicate with one another using one or more networks. Such networks may include public networks such as the Internet, private networks such as an institutional or personal intranet, or some combination of private and public networks. The networks may include any type of wired or wireless network, including but not limited to local area networks (LANs), wide area networks (WANs), wireless WANs (WWANs), wireless LANs (WLANs), mobile communications networks (e.g. 3G, 4G, etc.), and so forth. In some implementations, the communications between the various devices in the environments 100 and 200 may be encrypted or otherwise secured. For example, such communications may employ one or more public or private cryptographic keys, ciphers, digital certificates, or other credentials supported by a security protocol, such as any version of the Secure Sockets Layer (SSL) or the Transport Layer Security (TLS) protocol.

In the examples of FIGS. 1 and 2, the datastore(s) 108 are depicted as separate from the host device(s) 102 and the analysis device(s) 110. In such implementations, the datastore(s) 108 may operate on any number of data storage devices that communicate with the host device(s) 102 and the analysis device(s) 110 over any number of networks. In some implementations, the datastore(s) 108 may be at least partly incorporated into the host device(s) 102 or the analysis device(s) 110, such that at least a portion of the data 106 is stored in memory on the host device(s) 102 or the analysis device(s) 110.

The operations to determine the metadata 114 may be performed on the analysis device(s) 110 as shown in FIG. 1 or on the host device(s) 110 as shown in FIG. 2. Moreover, in some implementations the operations to determine the metadata 114 may be performed on both the host device(s) 102 and the analysis device(s) 110. For example, the operations to determine the structural characteristics 116 of the metadata 114 may be performed on the host device(s) 102, and the operations to determine the behavioral characteristic(s) 118 may be performed on the analysis device(s) 110. In some cases, the behavioral characteristic(s) 118 may be more dynamic and may change more frequently than the structural characteristic(s) 116, such that the determination of the behavioral characteristic(s) 118 may consume more processing resources than the determination of the more static structural characteristic(s) 116. Accordingly, the determination of the behavioral characteristic(s) 118 may be performed on the analysis device(s) 110 to avoid the use of processing capacity on the host device(s) 102 that may otherwise be employed in executing the source process(es) 104 or performing other actions.

In some cases, storage space on the datastore(s) 108 may be provided as a service to customers such as individuals or businesses. In such cases, the operations to track the baseline metadata 114(1) and identify changes in the current metadata 114(2) may also be offered as a service to the customers. Such a service may enable the customers to monitor the consistency and quality of the data 106 being written to the datastore(s) 108 by their source process(es) 104.

Figure 3:
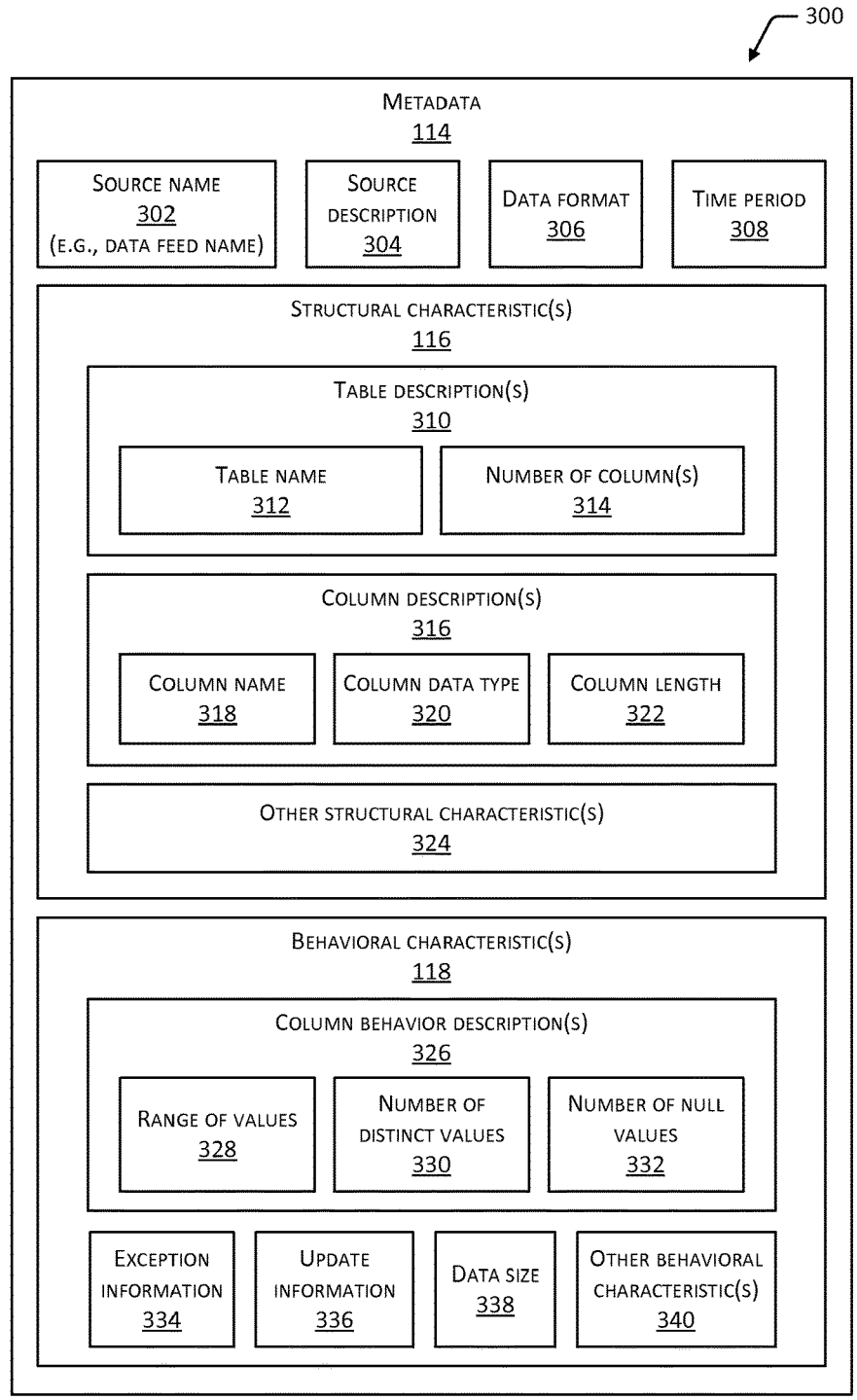
FIG. 3 depicts an example of the metadata describing structural and behavioral characteristics of data.

FIG. 3 depicts an example 300 of the metadata 114, such as the metadata 114(1) or the metadata 114(2). In some implementations, the metadata 114 may be described using a markup language such as a version of Extensible Markup Language (XML). Implementations also support the use of other markup languages to describe the metadata 114.

The metadata 114 may include a source name 302. The source name 302 may identify the source process 104 that generated the data 106 described by the metadata 114. In some cases, the source name 302 may identify the host device(s) 102 on which the source process 104 executed to generate the data 106. The source name 302 may identify the data feed that includes the data 106 generated by the source process 104. In some cases, the source name 302 may uniquely identify the data feed. A particular data feed may include data 106 to be stored in any number of tables or other data structures in the datastore(s) 108.

The metadata 114 may also include a source description 304 describing the source process 104 or the host device(s) 102. For example, the source description 304 may describe a version or build of the source process 104 that executed to generate the data 106. In some cases, the source description 304 may describe the manner in which the data 106 is stored in the datastore(s) 108, such as whether the data 106 is stored in a database, a file, or other data structure. The metadata 114 may include a data format 306 of the data 106. The data format 306 may indicate an encoding of the data 106 such as Universal Character Set Transformation Format (UTF)-8, UTF-16, UTF-32, and so forth. The data format 306 may also indicate whether the data 106 is unencrypted (e.g., plaintext) or encrypted, and whether the data 106 is compressed or uncompressed. The metadata 114 may also include a time period 308 when the data 106 was generated and stored, indicating that the metadata 114 is a description of the data 106 during the time period 308. In some implementations, one or more of the source name 302, the source description 304, the data format 306, or the time period 308 may be provided by individuals associated with the source process 104, such as designers, developers, testers, or others who may specify information regarding the data feed generated by the source process 104. In some cases, multiple sets of metadata 114 corresponding to different time periods 308 may be stored and analyzed to determine trends or patterns in the metadata 114 over time.

The metadata 114 may include a set of one or more structural characteristics 116. The structural characteristic(s) 116 may include one or more table descriptions 310 corresponding to the table(s) where the data 106 is written in the datastore(s) 108. A table may include data 106 written by any number of source process(es) 104. Each of the table description(s) 310 may include a table name 312 that identifies the table. A table description 310 may also describe the number of column(s) 314 to which the data 106 is written in the table. The structural characteristic(s) 116 may include one or more column descriptions 316 corresponding to the column(s) where the data 106 is written. Each of the column description(s) 316 may include a column name 318 that identifies a column. The column description 316 may indicate a column data type 320 of the column, such as numeric data (e.g., integer, float, double, etc.), text data, Boolean data, and so forth. The column description 316 may also indicate a column length 322 of the column, describing a maximum size of the values that may be written to the column or an amount of data that may be stored in the column. The structural characteristic(s) 116 may also include other structural characteristic(s) 324.

The metadata 114 may include a set of one or more behavioral characteristics 118. The behavioral characteristic(s) 118 may include one or more column behavior descriptions 326 that each describes the values of the data 106 that are written to a column during the time period 308. A column behavior description 326 may include a range of values 328 written to the column, such as a range from the lowest value to the highest value written to the column during the time period 308. In some cases, the range of values 328 may include one or both of a minimum value or a maximum value of the data 106 written to the column. A column behavior description 326 may include a number of distinct values 330 written to the column during the time period 308. A column behavior description 326 may also include a number of null values 332 written to the column during the time period 308, in cases where null values may be written to the column. A null value may be an empty value, such that a particular row includes no data for a column.

In some implementations, the behavioral characteristic(s) 118 may also include exception information 334. The exception information 334 may describe one or more exceptions to possible differences between the metadata 114(1) and the metadata 114(2). An exception may indicate an expected behavioral characteristic 118 of the data 106 under certain circumstances, such that a difference may be acceptable under such circumstances. In some cases, an exception may be associated with one or more days of the week or year. For example, an exception may be associated with one or more holidays, and may indicate that the range of values 328 on the holiday(s) is expected to be different than the range of values 328 on other days of the year. As another example, an exception may be associated with weekend days (e.g., Saturday and Sunday), and may indicate that the number of distinct values 330 on weekends is expected to be different than the number of distinct values 330 on other days of the week. The exception information 334 may vary based on one or more of the following: the preferences of individual(s) such as operators, or individual(s) associated with the source process 104 or data consuming process(es); changes in the generated data 106, such as new data 106 being generated; changes in the source process(es) 104 or the version of the source process(es) 104 that generates the data 106, such as new source process(es) 104 or updates to existing source process(es) 104; or other considerations.

In some implementations, the behavioral characteristic(s) 118 may include update information 336. The update information 336 may describe how recently the data 106(2) was changed, such as one or both of a date or time when the data 106(2) was last updated. The update information 336 may also identify a user or a process that made recent update(s) to the data 106(2), or the login credentials that were employed to make recent update(s).

In some implementations, the behavioral characteristic(s) 118 may include a data size 338 that describes a number of rows or records written during the time period 308 or an amount of the data 106 generated and stored during the time period 308. In some cases, the data size 338 may indicate that the source process 104 generated and wrote zero rows or records during the time period 308. The behavioral characteristic(s) 118 may also include other behavioral characteristic(s) 340.

Figure 4:
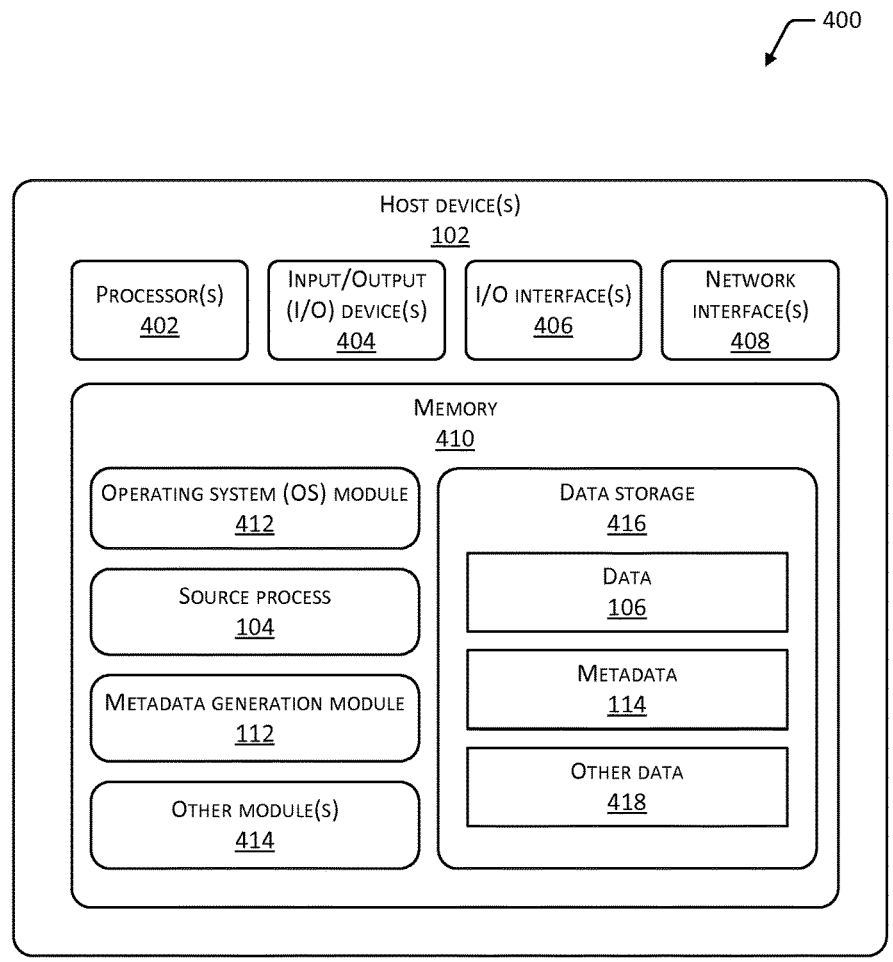
FIG. 4 depicts a block diagram of an example of host device(s) configured to execute source process(es) that generate data to be analyzed.

FIG. 4 depicts a block diagram 400 of an example of the host device(s) 102. As shown in the block diagram 400, the host device(s) 102 may include one or more processors 402 (e.g., hardware-based processor(s)) configured to execute one or more stored instructions. The processor(s) 402 may comprise one or more cores.

The host device(s) 102 may include one or more input/output (I/O) devices 404. The I/O device(s) 404 may include input devices such as a keyboard, a mouse, a pen, a game controller, a touch input device, an audio input device (e.g., a microphone), a gestural input device, a haptic input device, an image or video capture device (e.g., a camera), or other devices. In some cases, the I/O device(s) 404 may also include output devices such as a display, an audio output device (e.g., a speaker), a printer, a haptic output device, and so forth. The I/O device(s) 404 may be physically incorporated with the host device(s) 102 or may be externally placed.

The host device(s) 102 may include one or more I/O interfaces 406 to enable components or modules of the host device(s) 102 to control, interface with, or otherwise communicate with the I/O device(s) 404. The I/O interface(s) 406 may enable information to be transferred in or out of the host device(s) 102 or between components of the host device(s) 102, through serial communication, parallel communication, or other types of communication. For example, the I/O interface(s) 406 may comply with a version of the RS-232 standard for serial ports, or with a version of the IEEE 1284 standard for parallel ports. As another example, the I/O interface(s) 406 may be configured to provide a connection over Universal Serial Bus (USB) or Ethernet. In some cases, the I/O interface(s) 406 may be configured to provide a serial connection that is compliant with a version of the IEEE 1394 standard. The host device(s) 102 may also include one or more busses or other internal communications hardware or software that allow for the transfer of data between the various modules and components of the host device(s) 102.

The host device(s) 102 may include one or more network interfaces 408 that enable communications between the host device(s) 102 and other network accessible computing devices, such as the analysis device(s) 110. The network interface(s) 408 may include one or more network interface controllers (NICs) or other types of transceiver devices configured to send and receive communications over a network.

The host device(s) 102 may include one or more memories, described herein as memory 410. The memory 410 comprises one or more computer-readable storage media (CRSM). The CRSM may include one or more of an electronic storage medium, a magnetic storage medium, an optical storage medium, a quantum storage medium, a mechanical computer storage medium, and so forth. The memory 410 provides storage of computer-readable instructions that may describe data structures, program modules, processes, applications, or other data for the operation of the host device(s) 102. In some implementations, the memory 410 may provide storage of computer-readable instructions or other information in a non-transitory format.

The memory 410 may include an operating system (OS) module 412. The OS module 412 may be configured to manage hardware resources such as the I/O device(s) 404, the I/O interface(s) 406, and the network interface(s) 408, and to provide various services to applications, processes, or modules executing on the processor(s) 402. The OS module 412 may include one or more of the following: any version of the Linux operating system; any version of iOS from Apple Corp. of Cupertino, Calif., USA; any version of Windows or Windows Mobile from Microsoft Corp. of Redmond, Wash., USA; any version of Android from Google Corp. of Mountain View, Calif., USA and its derivatives from various sources; any version of Palm OS from Palm Computing, Inc. of Sunnyvale, Calif., USA and its derivatives from various sources; any version of BlackBerry OS from Research In Motion Ltd. of Waterloo, Ontario, Canada; any version of VxWorks from Wind River Systems of Alameda, Calif., USA; or other operating systems.

The memory 410 may include one or more of the modules described above as executing on the host device(s) 102, such as the source process 104 or the metadata generation module 112. The memory 410 may also include one or more other modules 414, such as a user authentication module or an access control module to secure access to the host device(s) 102, and so forth.

The memory 410 may include data storage 416 to store data for operations of the host device(s) 102. The data storage 416 may comprise a database, array, structured list, tree, or other data structure, and may be a relational or a non-relational datastore. The data storage 416 may store any of the types of data described above as being present on the host device(s) 102, including one or more of the data 106 or the metadata 114. The data storage 416 may also store other data 418 such as user authentication information, access control data, or other information. In some implementations, at least a portion of the information stored in the data storage 416 may be stored externally to the host device(s) 102, on other devices that may communicate with the host device(s) 102 via the I/O interface(s) 406 or via the network interface(s) 408.

Figure 5:
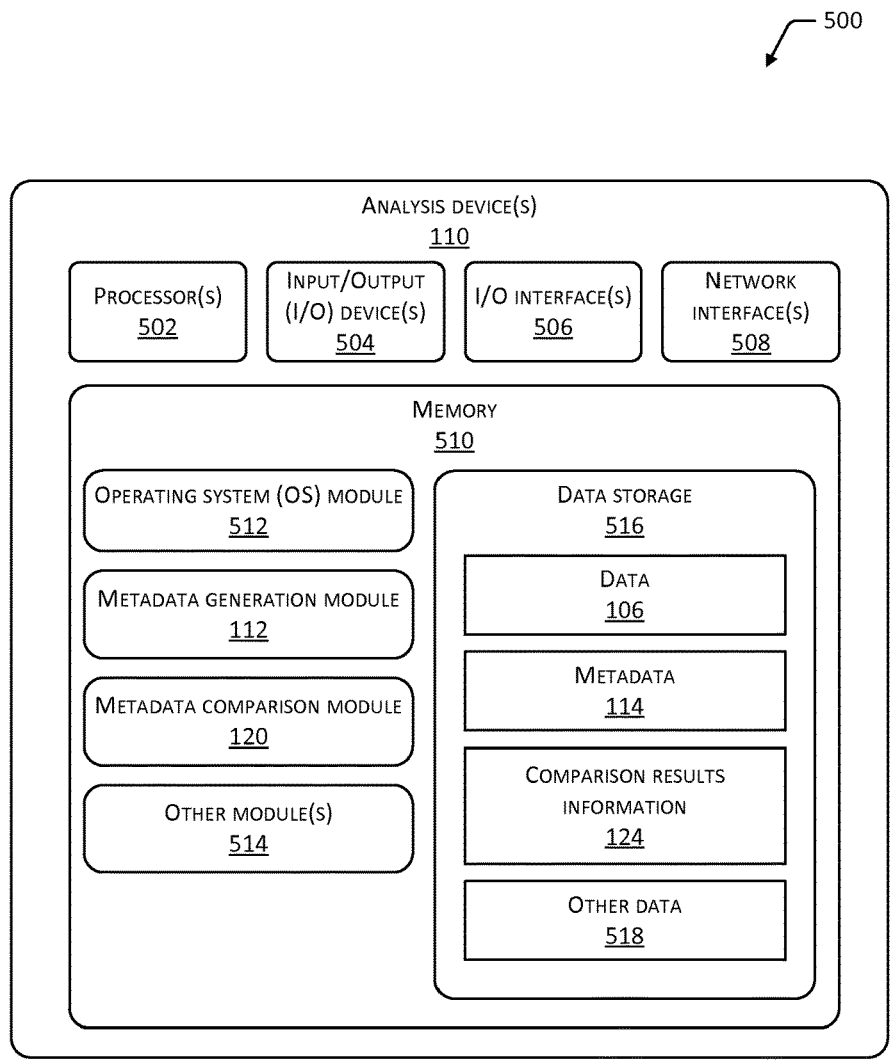
FIG. 5 depicts a block diagram of an example of analysis device(s) configured to detect changes in data using metadata that describes structural and behavioral characteristics of the data.

FIG. 5 depicts a block diagram 500 of an example of the analysis device(s) 110. As shown in the block diagram 500, the analysis device(s) 110 may include one or more processors 502 (e.g., hardware-based processor(s)) configured to execute one or more stored instructions. The processor(s) 502 may comprise one or more cores. The analysis device(s) 110 may include one or more I/O devices 504, one or more I/O interfaces 506, and one or more network interfaces 508 as described above respectively with reference to the I/O device(s) 404, the I/O interface(s) 406, and the network interface(s) 408.

The analysis device(s) 110 may include one or more memories, described herein as memory 510. The memory 510 comprises one or more CRSM, as described above with reference to the memory 410. The memory 510 may include an OS module 512 that is configured to manage hardware resources such as the I/O device(s) 504, the I/O interface(s) 506, and the network interface(s) 508, and to provide various services to applications, processes, or modules executing on the processor(s) 502. The OS module 512 may include one or more of the operating systems described above with reference to the OS module 412. The memory 510 may include one or more of the modules described above as executing on the analysis device(s) 110, such as the metadata generation module 112 or the metadata comparison module 120. The memory 510 may also include one or more other modules 514, such as a user authentication module or an access control module to secure access to the analysis device(s) 110, and so forth.

The memory 510 may include the data storage 516, which may store data for operations of the analysis device(s) 110. The data storage 516 may comprise a database, array, structured list, tree, or other data structure, and may be a relational or a non-relational datastore. The data storage 516 may store data such as that described above as present on the analysis device(s) 110, including one or more of the data 106, the metadata 114, or the comparison results information 124. The data storage 516 may also store other data 518, such as user authentication information or access control data. In some implementations, at least a portion of the information stored in the data storage 516 may be stored externally to the analysis device(s) 110, on other devices that may communicate with the analysis device(s) 110 via the I/O interface(s) 506 or via the network interface(s) 508.

Figure 6:
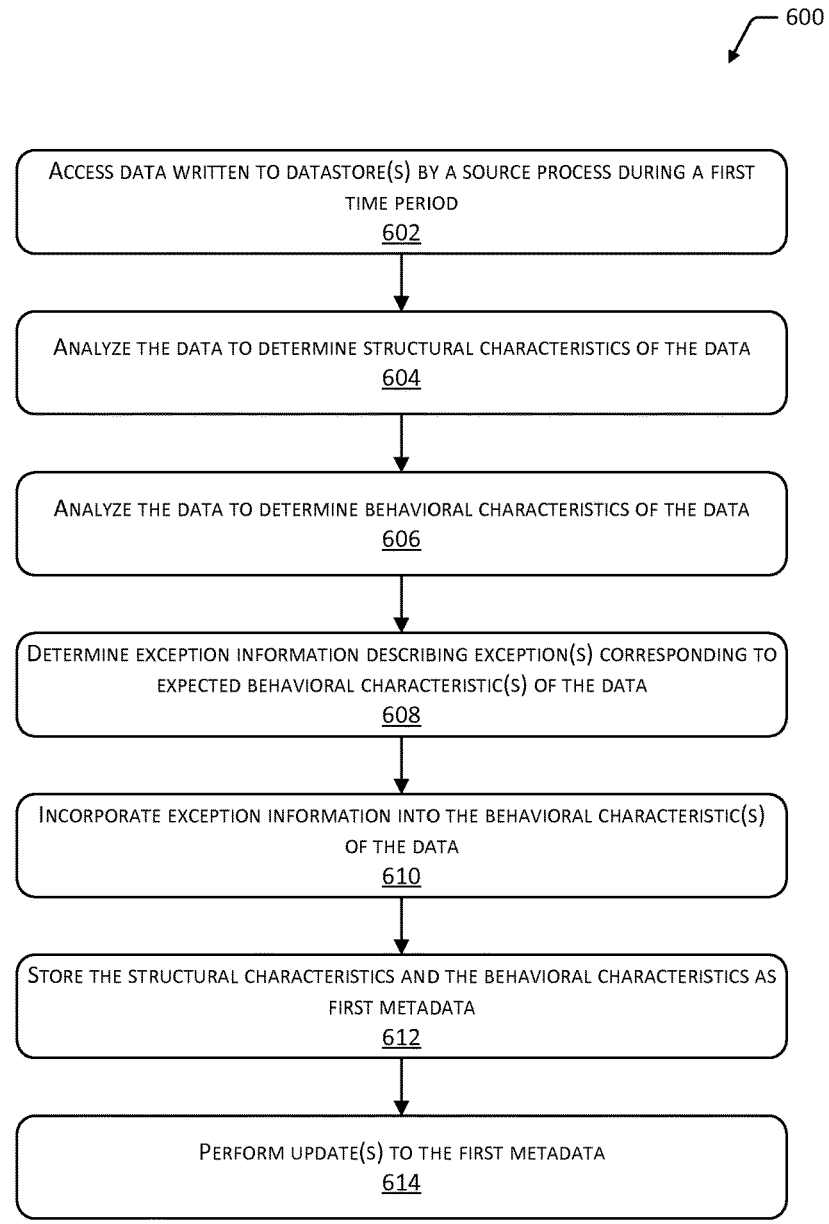
FIG. 6 depicts a flow diagram of a process for determining first metadata to employ as a baseline for detecting behavioral or structural changes in data.

FIG. 6 depicts a flow diagram 600 of a process for determining the first metadata 114(1) to employ as a baseline for detecting behavioral or structural changes in the data 106. Operations of the process may be performed by the source process 104, the metadata generation module 112, the metadata comparison module 120, or by other modules executing on the host device(s) 102, the analysis device(s) 110, or elsewhere.

At 602, the data 106(1) is accessed. The data 106(1) may be generated and written to the datastore(s) 108 by the source process 104 during a first time period. At 604, the data 106(1) may be analyzed to determine one or more structural characteristics 116 of the data 106(1). At 606, the data 106(1) may be analyzed to determine one or more behavioral characteristics 118 of the data 106(1). The structural characteristic(s) 116 and the behavioral characteristic(s) 118 may include those characteristics described with reference to FIG. 3.

At 608, in some implementations the exception information 334 may be determined. The exception information 334 may describe any number of exceptions that correspond to expected behavioral characteristic(s) 118 of the data 106. In some cases, the exception information 334 may be determined manually. At 610, the exception information 334 may be incorporated into the behavioral characteristic(s) 118 of the data 106(1). At 612, the structural characteristic(s) 116 and the behavioral characteristic(s) 118 may be stored as the metadata 114(1).

At 614, in some implementations one or more updates may be applied to the metadata 114(1) (e.g., the baseline metadata) after it is initially generated and stored. The update(s) may add, remove, or change one or more of the structural characteristic(s) 116 or the behavioral characteristic(s) 118. The update(s) to the metadata 114(1) may also include changes to the exception information 334. In some implementations, the metadata 114(1) may be updated manually by operators or other individuals. Alternatively, the metadata 114(1) may be updated by an automated process such as an adaptive or machine learning process as described with reference to FIG. 9.

Figure 7:
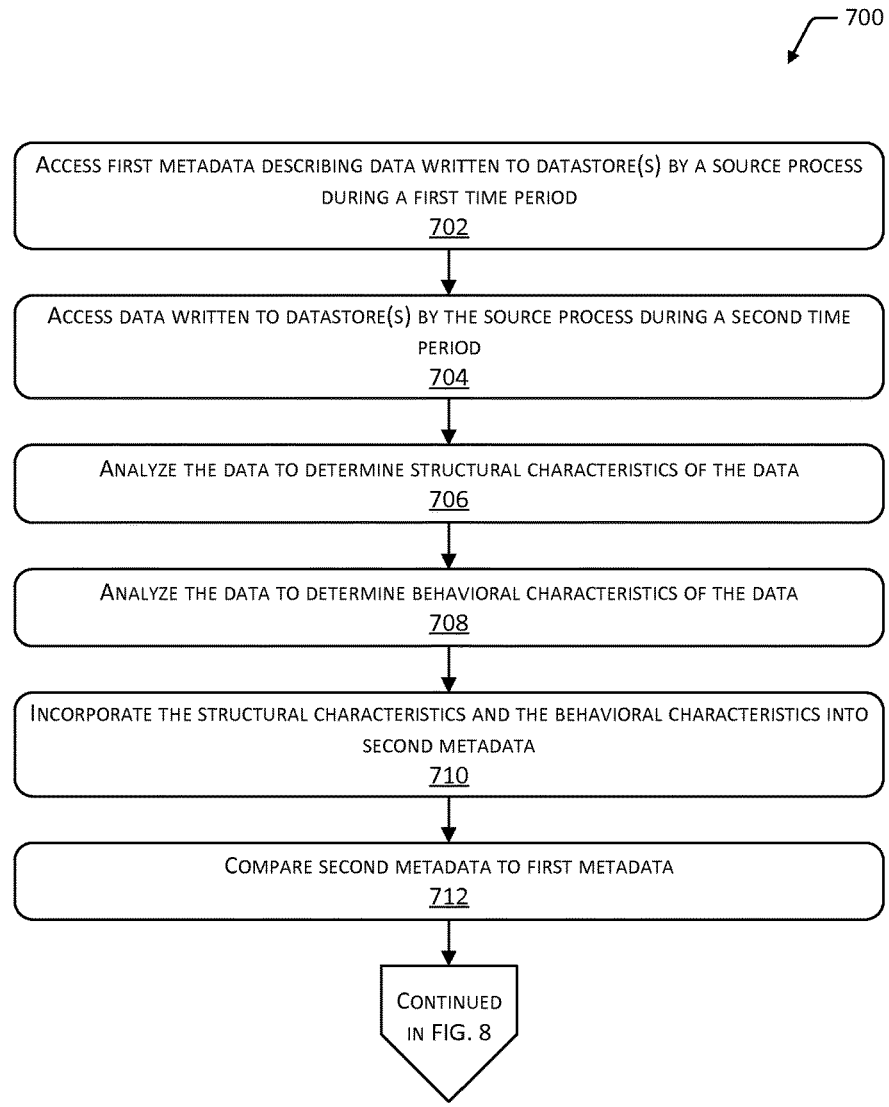
FIG. 7 depicts a flow diagram of a process for determining second metadata describing structural or behavioral characteristics of data, and comparing the second metadata to first metadata.
Figure 8:
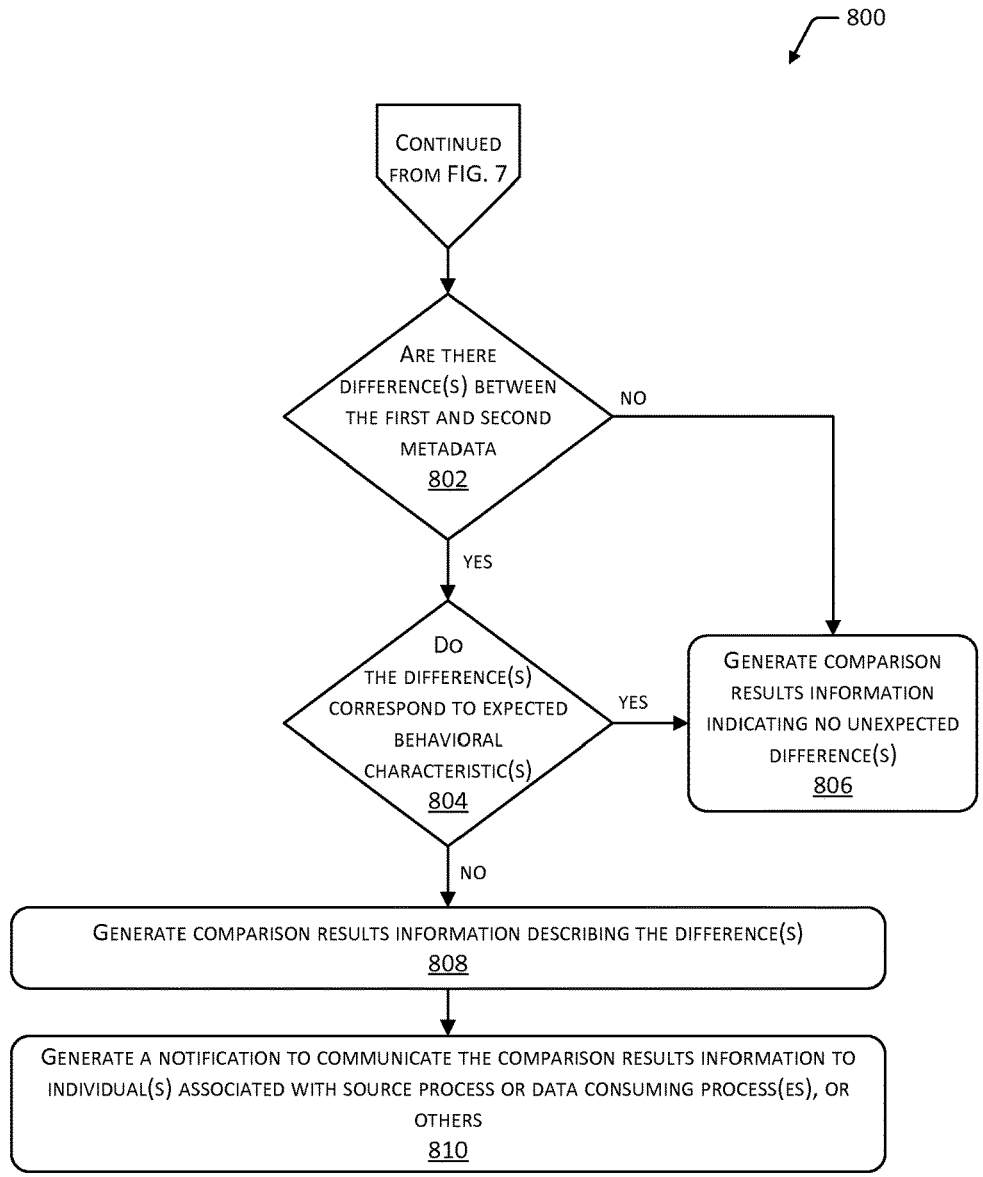
FIG. 8 depicts a flow diagram of a continuation of the process for determining second metadata describing structural or behavioral characteristics of data, and comparing the second metadata to first metadata.

FIGS. 7 and 8 depict flow diagrams 700 and 800 of a process for determining the second metadata 114(2) describing structural characteristics 116 or behavioral characteristics 118 of the data 106(2), and comparing the second metadata 114(2) to the first metadata 114(1). Operations of the process may be performed by the source process 104, the metadata generation module 112, the metadata comparison module 120, or by other modules executing on the host device(s) 102, the analysis device(s) 110, or elsewhere.

At 702, the metadata 114(1) may be accessed. The metadata 114(1) may have been previously generated as described with reference to FIG. 6, and may describe the data 106(1) written to the datastore(s) 108 by the source process 104 during a first time period.

At 704, the data 106(2) may be accessed. The data 106(2) may be generated and written to the datastore(s) 108 by the source process 104 during a second time period that is non-contemporaneous with the first time period. At 706, the data 106(2) may be analyzed to determine one or more structural characteristics 116 of the data 106(2). At 708, the data 106(2) may be analyzed to determine one or more behavioral characteristics 118 of the data 106(2). At 710, the structural characteristic(s) 116 and the behavioral characteristic(s) 118 determined respectively at 706 and 708 may be incorporated into the metadata 114(2).

At 712, the metadata 114(2) may be compared to the metadata 114(1). In some implementations, corresponding characteristics may be compared between the metadata 114(2) and the metadata 114(1). For example, the column name(s) 318 in the metadata 114(1) may be compared to the column name(s) 318 in the metadata 114(2), the range(s) of values 328 in the metadata 114(1) may be compared to the range(s) of values 328 in the metadata 114(2), and so forth. In some implementations, particular structural characteristic(s) 116 or behavioral characteristic(s) 118 may be compared in the metadata 114(1) and the metadata 114(2) at 712, and other characteristics of the metadata 114(1) and the metadata 114(2) may not be compared. For example, in some cases the data size 338 may increase over time under typical operating conditions of the source process 104, such that comparing the data size 338 in the metadata 114(1) and the metadata 114(2) may not provide any useful information, and the comparison of the data size 338 may be omitted from the analysis at 712. Alternatively, in cases where the data size 338 of the metadata 114(2) indicates that the source process 104 generated and wrote zero rows and the metadata 114(1) indicates a non-zero number of rows, the comparison at 712 may identify the occurrence of zero rows as an issue to be investigated.

The particular characteristic(s) compared at 712 may vary based on one or more of the following: the preferences of individual(s) such as operators, or individual(s) associated with the source process 104 or data consuming process(es); changes in the generated data 106, such as new data 106 being generated; changes in the source process(es) 104 or the version of the source process(es) 104 that generate the data 106, such as new source process(es) 104 or updates to existing source process(es) 104; or other considerations. The process may continue as described with reference to FIG. 8.

At 802, a determination is made whether there are any differences between at least a portion of the metadata 114(1) and at least a portion of the metadata 114(2) that was compared at 712. If there are no differences, the process may proceed to 806. If there are any differences, the process may proceed to 804. At 804, in implementations where the metadata 114(1) includes the exception information 334, a determination may be made whether the difference(s) correspond to expected behavioral characteristic(s) 118 as described with reference to FIG. 3. If so, the process may proceed to 806.

At 806, if there are no differences between the metadata 114(1) and the metadata 114(2), or if the differences correspond to the expected behavioral characteristic(s) 118 described in the exception information 334, the comparison results information 124 may be generated indicating no differences or no unexpected differences. The comparison results information 124 may be stored in a location that is accessible to individuals such as engineers, managers, database operations specialists, and so forth. In some cases, the comparison results information 124 may be sent in a notification 122 to such individual(s).

If there are one or more differences between the metadata 114(1) and the metadata 114(2), and such difference(s) are not described in the exception information 334, at 808 the comparison results information 124 may be generated describing the difference(s). At 810, a notification 122 may be generated to communicate the comparison results information 124 to individual(s) associated with the source process 104 such as engineers, managers, operators, and so forth. The notification 122 may also be communicated to individual(s) who use the data 106(2) or who are associated with data consuming process(es) that use the data 106(2). The notification 122 may enable such individual(s) to modify their processes or operations according to the changes in the data 106 generated by the source process 104.

In some implementations, the comparison results information 124 may be stored in a database that is accessible to various individuals associated with the source process 104, data consuming process(es), system managers, operators, or others. For example, the comparison results information 124 may be accessed by individuals responsible for data governance or data normalization across an organization. Moreover, in some implementations the various sets of the metadata 114, which are generated based on various sets of the data 106, may be stored and analyzed to identify trends or other changes that may occur in the metadata 114 over time. In some cases, the sets of metadata 114 may be stored in a (e.g., central) database that is accessible to various individuals associated with the source process 104, data consuming process(es), system managers, operators, or others within an organization. The determined trends or changes in the metadata 114 may also be stored in such a database.

Figure 9:
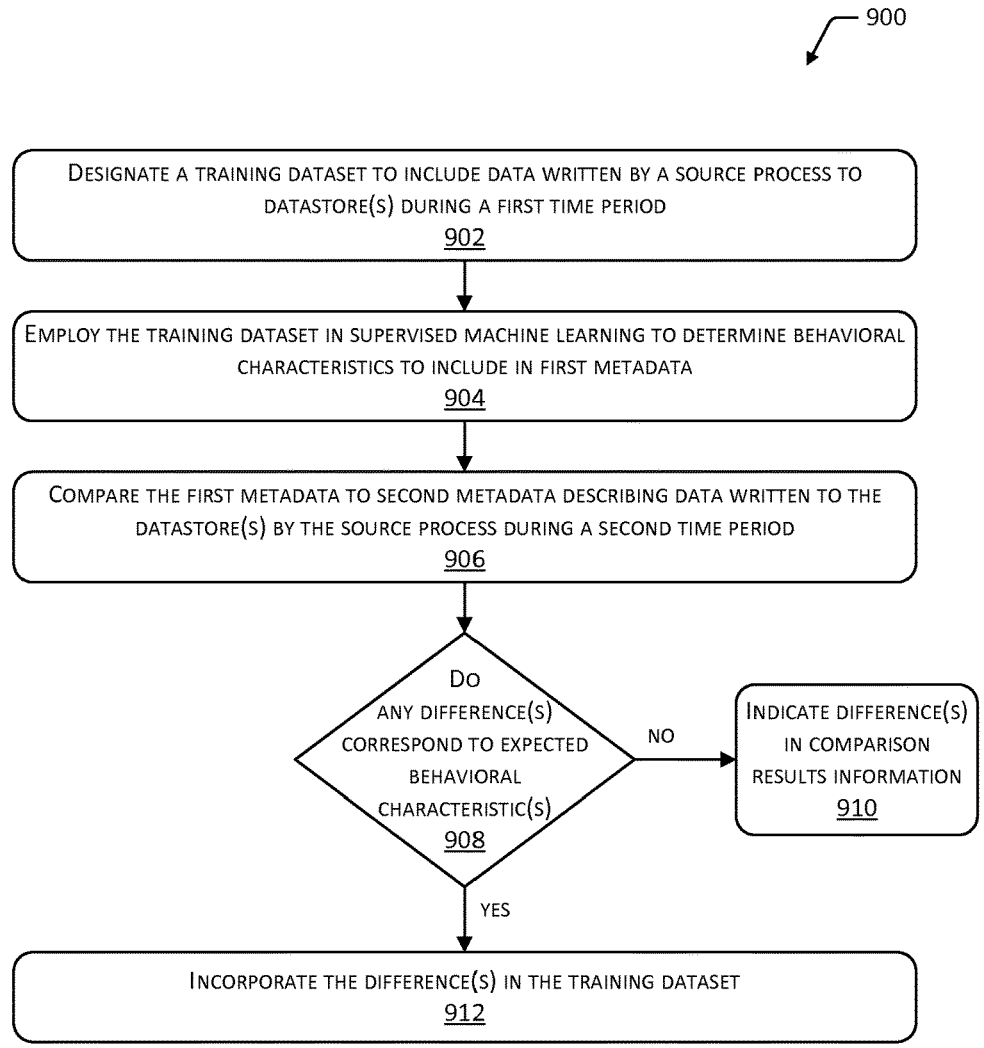
FIG. 9 depicts a flow diagram of a process for employing machine learning to determine the first metadata as a baseline for detecting behavioral changes in data.

FIG. 9 depicts a flow diagram 900 of a process for employing machine learning to determine the first metadata 114(1) to employ as a baseline for detecting behavioral changes in the data 106. Operations of the process may be performed by the source process 104, the metadata generation module 112, the metadata comparison module 120, or by other modules executing on the host device(s) 102, the analysis device(s) 110, or elsewhere.

At 902, at least a portion of the data 106(1) written to the datastore(s) 108 by the source process 104 may be designated as a training dataset. At 904, the training dataset may be employed in a machine learning process to determine the behavioral characteristic(s) 118 of the metadata 114(1) (e.g., the baseline metadata 114). Implementations support the use of any supervised or unsupervised machine learning algorithms or techniques, including but not limited to one or more of the following: artificial neural networks, inductive logic programming, support vector machines (SVMs), clustering, classification, Bayesian networks, decision tree learning, association rule learning, reinforcement learning, representation learning, similarity learning, metric learning, sparse dictionary learning, and so forth. In some implementations, the training dataset may be employed to train a classifier that includes or accesses the metadata 114(1), and the classifier may be employed to determine whether differences in the metadata 114(2) for the data 106(2) are acceptable.

At 906, the metadata 114(1) may be compared to the metadata 114(2) as described with reference to FIGS. 7 and 8. At 908, a determination may be made whether the difference(s) correspond to the expected behavioral characteristic(s) 118 described in the exception information 334. If it is determined at 908 that the difference(s) do not correspond to the expected behavioral characteristic(s) 118 described in the exception information 334, or if the metadata 114(1) does not include the exception information 334, the process may proceed to 910. At 910, the difference(s) may be described in the comparison results information 124 as described with reference to FIG. 8.

If it is determined at 908 that the difference(s) correspond to the expected behavioral characteristic(s) 118 described in the exception information 334, the process may proceed to 912. At 912, information describing the difference(s) may be incorporated into the training dataset. In cases where the difference(s) are expected or otherwise acceptable (e.g., included in the exception information 334), the difference(s) may be incorporated in the training dataset to train the classifier to not identify such difference(s) in subsequent analyses. The training dataset may then be employed to further train the classifier to identify differences between the metadata 114(1) and the metadata 114(2). In some cases, the training data may also include manually generated training data that describes cases where differences between the metadata 114(1) and the metadata 114(2) are acceptable or unacceptable. In some cases, the difference(s) may be manually analyzed to determine whether the difference(s) are significant such that they indicate a potential problem or merit further investigation. If not, the difference(s) may be incorporated into the training dataset to train a classifier or other machine to disregard such difference(s) during subsequent analyses.

In some implementations, the machine learning process may determine a current set of difference(s) between the current metadata 114(2) and the baseline metadata 114(1). The machine learning process may compare each of the current difference(s) to previous events or notifications that indicate previous difference(s) between the baseline metadata 114(1) and the current metadata 114(2). The machine learning process may also compare the current difference(s) to the exception information 334 that describes expected behavior(s) of the data 106, where such exception information 334 may have been previously determined manually or through an automatic process. If a current difference is not included in the previous set of difference(s), and is not described in the exception information 334, the machine learning process may classify the current difference as an aberration to be further investigated. If a current difference is included in the previous set of difference(s), or is described in the exception information 334, the machine learning process may classify the current difference as excepted behavior of the data feed and may not include the difference in the notification 122 to trigger further investigation.

Those having ordinary skill in the art will readily recognize that certain steps or operations illustrated in the figures above may be eliminated, combined, or performed in an alternate order. Any steps or operations may be performed serially or in parallel. Moreover, the methods described above may be implemented as one or more software programs for a computer system and may be encoded in a computer-readable storage medium as instructions executable on one or more processors.

Embodiments may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, and so forth. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art. It is intended that the present disclosure encompass such changes and modifications that fall within the scope of the appended claims.

What is claimed is:

1. A computer-implemented method, comprising:
    receiving, at an analysis device, first metadata from a metadata generation module of a host device, the first metadata describing a first dataset of data written to at least one datastore by a source process during a first time period, the first metadata being generated upon generation of the first dataset and comprising a first set of structural characteristics and a first set of behavioral characteristics, the first metadata further including exception information describing expected behavioral characteristics of the first dataset that is acceptable under predetermined circumstances;
    using the first metadata as baseline metadata to identify one or more expected behavioral characteristics of the first dataset under the predetermined circumstances, wherein a variation from the baseline metadata of the first dataset is acceptable under the predetermined circumstances;
    receiving, at the analysis device, second metadata from the metadata generation module of the host device, the second metadata describing a second dataset of the data written to the at least one datastore by the source process during a second time period that is non-contemporaneous with the first time period, the second metadata comprising a second set of the structural characteristics and a second set of behavioral characteristics, the second metadata being generated upon generation of the second dataset;
    detecting a change in a data feed, resulting from a change in the source process, the change in the data feed detected by determining at least one difference between the first metadata and the second metadata;
    analyzing the exception information, wherein the at least one difference between the first metadata and the second metadata corresponding to the expected behavioral characteristics of the first dataset of the data that is acceptable under the predetermined circumstances does not trigger a notification describing the at least one difference between the first metadata and the second metadata;
    determining that the at least one difference does not correspond to the expected behavioral characteristics of the first dataset of the data that is acceptable under the predetermined circumstances;
    in response to the determining that the at least one difference does not correspond to the expected behavioral characteristics of the data that is acceptable under the predetermined circumstances, generating the notification describing the at least one difference between the first metadata and the second metadata; and
    responsive to the generating of the notification, modifying the source process to address the change in the data feed.

2. The method of claim 1, wherein:
    the first set of structural characteristics describe one or more of:
        a table in which the data is stored in the at least one datastore;
        a column in which the data is stored;
        a column data type for the column;
        a column length of the column; or
        a number of columns in which the data is stored; and
    the first set of behavioral characteristics describe one or more of:
        a data size of the data stored in the table;
        a range of values of the data stored in the column;
        a number of distinct values of the data stored in the column; or
        a number of null values in the data stored in the column.

3. The method of claim 1, wherein the at least one datastore is managed using a relational database management system.

4. The method of claim 1, further comprising communicating the notification to at least one individual associated with one or more of:
    the source process that writes the data to the at least one datastore; or
    a consuming process that retrieves the data from the at least one datastore.

5. A system, comprising:
    at least one computing device configured to implement one or more services, the one or more services configured to:
        receive first metadata from a metadata generation module of a host device, the first metadata associated with a first dataset of data obtained from a source process during a first time period, the first metadata being generated upon generation of the first dataset and including one or more behavioral characteristics describing a behavior of the first dataset of the data;
        receive second metadata from the metadata generation module of the host device, the second metadata associated with a second dataset of the data that is obtained from the source process during a second time period, the second metadata being generated upon generation of the second dataset and including one or more behavioral characteristics describing a behavior of the second dataset of the data and exception information describing one or more expected behavioral characteristics describing a behavior of the second dataset of the data that is acceptable under predetermined circumstances;

detect at least one difference between the second metadata and the first metadata indicative of a change in the source process;

determine the at least one difference between the first metadata and the second metadata that does not correspond to the exception information describing the one or more expected behavioral characteristics of the second dataset of the data that is acceptable under the predetermined circumstances;

generate comparison results information describing the at least one difference, the comparison results information indicative of the change in a data feed; and use the comparison results information to modify the source process to address the change in the data feed.

6. The system of claim 5, wherein the one or more behavioral characteristics describe one or more of:

a minimum value of data stored in a column;

a maximum value of the data stored in the column;

a data size of data stored in at least one datastore;

a number of distinct values of the data stored in the column; or a number of null values in the data stored in the column.

7. The system of claim 5, wherein:

the first metadata further includes a first set of structural characteristics that describe a structure of data written to at least one datastore; and the second metadata further includes a second set of structural characteristics.

8. The system of claim 7, wherein the first set of structural characteristics describe one or more of:

a table in which the data is stored in at least one datastore;

a column in which the data is stored;

a column data type for the column;

a column length of the column; or a number of columns in which the data is stored.

9. The system of claim 5, wherein the one or more services are further configured to:

in response to determining that the at least one difference between the first metadata and the second metadata corresponds to the exception information describing the one or more expected behavioral characteristics of the second dataset of the data that is acceptable under the predetermined circumstances, omit the at least one difference from the comparison results information.

10. The system of claim 5, wherein the receiving the first metadata further comprises:

designating at least a portion of the first dataset of the data as a training dataset; and employing the training dataset in a supervised machine learning process to determine the behavioral characteristics to include in the first metadata.

11. The system of claim 10, wherein the receiving the first metadata further comprises:

designating the at least one difference as an expected behavioral characteristic of the data that is acceptable under the predetermined circumstances; and incorporating the at least one difference in the training dataset to disregard the at least one difference during a subsequent determination of the behavioral characteristics.

12. The system of claim 11, wherein the designating the at least one difference as the expected behavioral characteristic that is acceptable under the predetermined circumstances is associated with the expected behavioral characteristic on at least one date.

13. The system of claim 5, wherein the receiving the second metadata is performed dynamically with respect to the second dataset written to at least one datastore.

14. The system of claim 5, wherein at least the first metadata is stored in at least one datastore that is managed using a relational database management system.

15. One or more computer-readable media storing instructions which, when executed by at least one processor, instruct the at least one processor to perform actions comprising:

writing, by a host device, a first dataset of data to at least one datastore by a source process;

generating, by a metadata generation module, first metadata associated with the first dataset, the first metadata comprising a first set of structural characteristics, a first set of behavioral characteristics, and exception information describing expected behavioral characteristics of the first dataset acceptable under predetermined circumstances;

receiving, at an analysis device, the first metadata;

writing, by a host device, a second dataset of the data to at least one datastore by the source process;

generating, by the metadata generation module, second metadata comprising a second set of the structural characteristics and a second set of behavioral characteristics;

receiving the second metadata at the analysis device;

comparing, by the analysis device, the second set of the behavioral characteristics of the second dataset and the first set of the behavioral characteristics of the first dataset;

determining, by the analysis device, a variation between the first set of behavioral characteristics of the first dataset and the second set of behavioral characteristics of the second dataset to the exception information;

determining, by the analysis device, the variation represents an unexpected difference between the first set of behavioral characteristics of the first dataset and the second set of behavioral characteristics of the second dataset resulting from a change in the source process;

based on the unexpected difference, sending, to the host device, a notification generated by the analysis device that describes the variation between the first set of behavioral characteristics of the first dataset and the second set of behavioral characteristics of the second dataset; and responsive to the sending the notification, modifying the source process by the host device to address the change in the source process.

16. The one or more computer-readable media of claim 15, wherein the first set of structural characteristics describe one or more of:

a table in which the data is stored in at least one datastore;

a column in which the data is stored;

a column data type for the column;

a column length of the column; or a number of columns in which the data is stored.

17. The one or more computer-readable media of claim 15, wherein the receiving the first metadata further comprises:
  designating at least a portion of the first dataset as a training dataset; and
  employing the training dataset in a supervised machine learning process to generate the first metadata including the first set of structural characteristics, the first set of behavioral characteristics, and the exception information describing expected behavioral characteristics of the first dataset acceptable under the predetermined circumstances.

18. The one or more computer-readable media of claim 15, wherein the first set of the behavioral characteristics describe one or more of:
  a data size of the data;
  a range of values of the data stored in a column;
  a number of distinct values of the data stored in the column; or
  a number of null values in the data stored in the column.

19. The one or more computer-readable media of claim 15, wherein:
  the first dataset is written to the at least one datastore by the source process during a first time period; and
  the second dataset is written to the at least one datastore by the source process during a second time period that is after the first time period.

20. The one or more computer-readable media of claim 19, wherein the at least one datastore includes at least one non-relational datastore.

* * * * *